April 8, 1930.   S. M. MILNE   1,753,575
WEAR INDICATING APPARATUS
Filed April 26, 1926   3 Sheets-Sheet 1
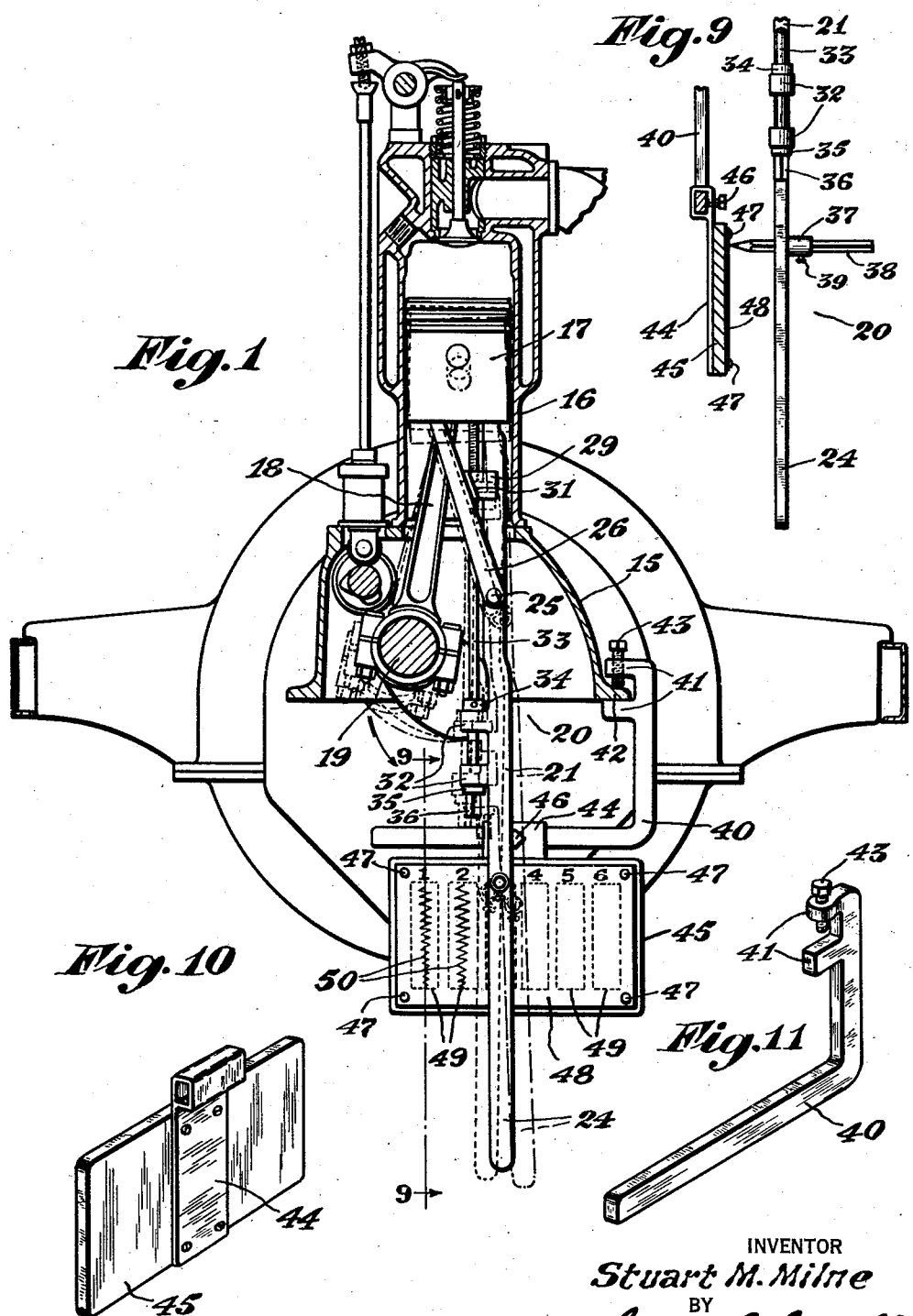
INVENTOR
Stuart M. Milne
BY
James E. Sproll
ATTORNEY

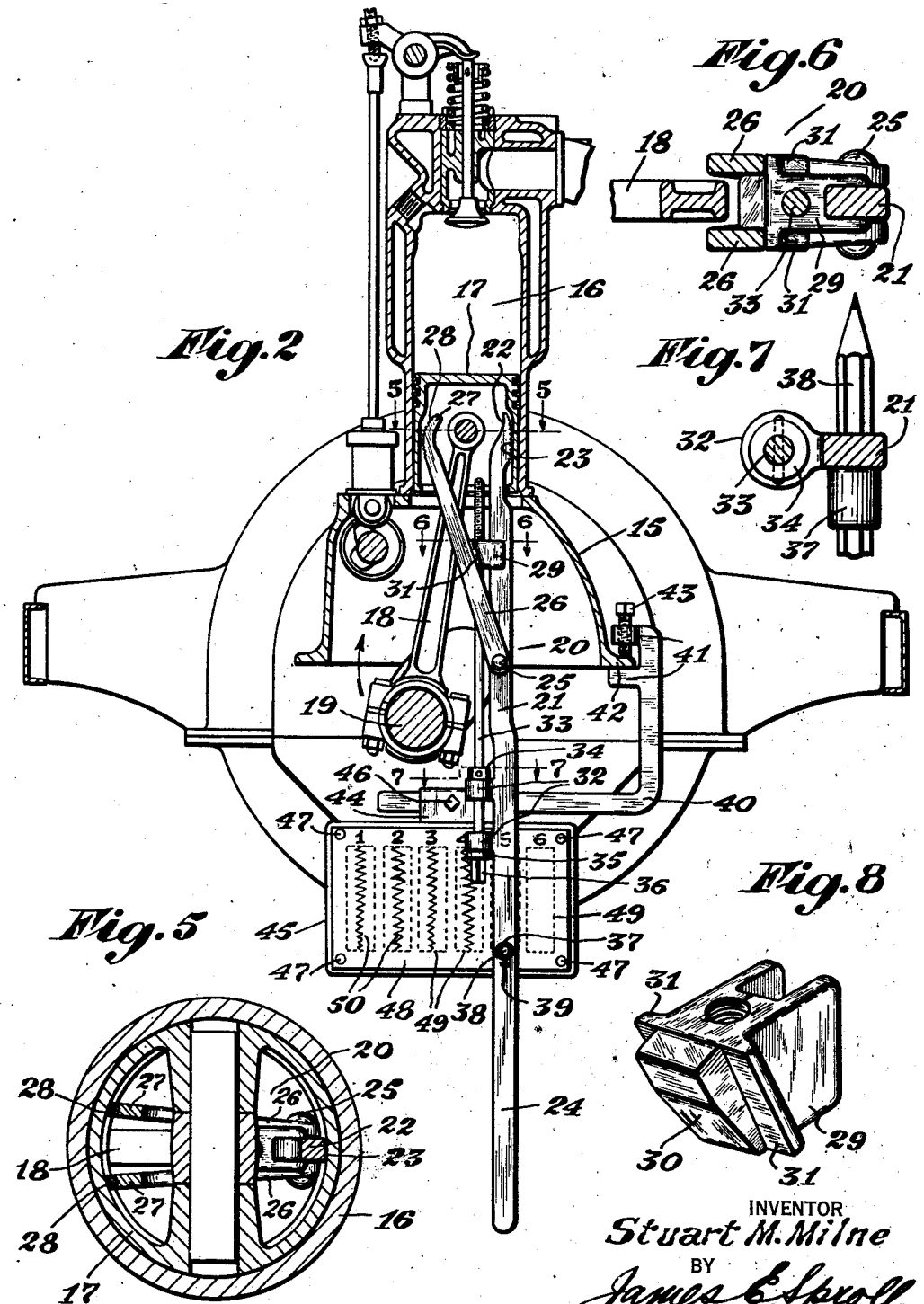

April 8, 1930.  S. M. MILNE  1,753,575
WEAR INDICATING APPARATUS
Filed April 26, 1926  3 Sheets-Sheet 3
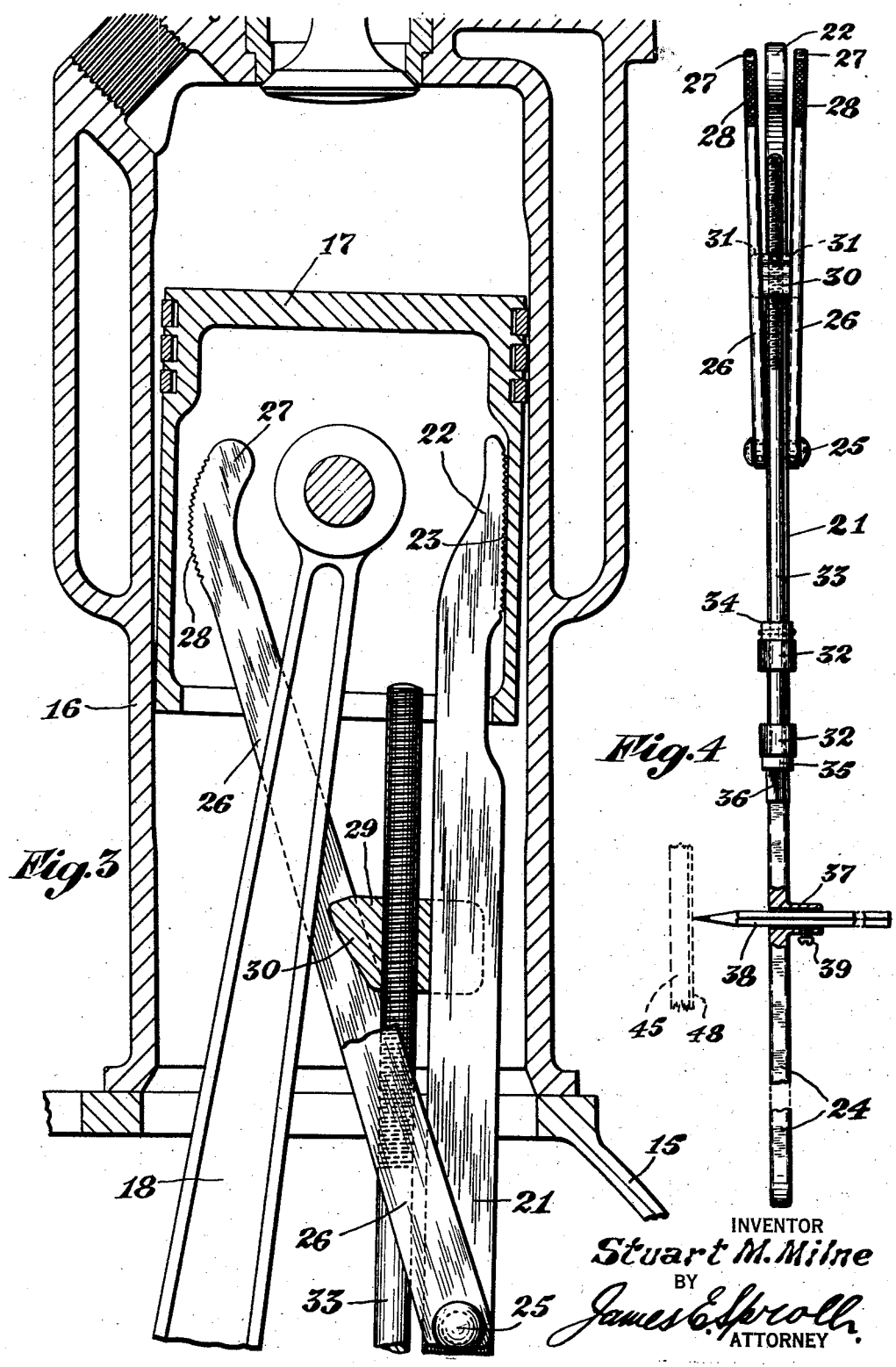

Patented Apr. 8, 1930

1,753,575

UNITED STATES PATENT OFFICE

STUART M. MILNE, OF SEATTLE, WASHINGTON

WEAR-INDICATING APPARATUS

Application filed April 26, 1926. Serial No. 104,603.

The primary aim of the present invention is the provision of wear indicating apparatus especially designed for use and employment by garagemen, automobile repairmen and the like, to rapidly and expeditiously determine and accurately indicate by charts or graphic representations the amount of wear upon and condition of the individual cylinder and piston walls of automotive vehicle engines, which charts are furnished for the convenience and information of the vehicle owners to convincingly demonstrate to such owners the actual conditions of the cylinder walls and pistons of their respective engines by positively indicating thereon, which cylinders and pistons are excessively or so badly worn as to cause the pistons to slap or knock within the cylinders and to require replacement by larger size pistons.

This invention contemplates retaining the pistons, connecting rods and crank shaft in operative interconnected relation within the engine, utilizing said pistons as gauges to calibrate the correlated cylinders thereof to ascertain the amount of wear or clearance therebetween by rigidly securing thereto the vibratile apparatus evolved by the invention and oscillating such pistons therewith concurrently with the turning of the crank shaft to impart axial movement to the pistons, the oscillative movement of the apparatus indicating the amount of wear or clearance between the cylinders.

With the above in view the invention essentially resides and is more particularly concerned in the provision of wear indicating apparatus for the cylinders and pistons of automotive vehicle engines, and in the preferred embodiment thereof is characterized by the employment of a depending vibratile bar readily insertible at the upper end within such pistons; of novel mechanism for rigidly securing or clamping said bar within said pistons; of a chart board positively retained in selective longitudinally and laterally adjusted positions relative to said cylinders; and of a marker carried by said vibratile bar for contacting with the chart carried by said board, all of which are important elements of the invention and are to be correlated in the broad aim of enhancing the efficiency of the device for general use.

The above, and additional objects which will be hereinafter more specifically treated, are attained by such means as are shown in the accompanying drawings, described in the following specification and then more clearly pointed out in the claims, which are appended hereto and form a part of this application.

With reference to the drawings, in which there is illustrated one embodiment of the invention, and throughout the several views of which like characters of reference designate similar parts, Figure 1 is a vertical transverse section of an internal combustion engine having the wear indicating apparatus comprehended by the present invention operatively attached to a piston and the upper crank case thereof, said piston being illustrated in elevation and adjacent the end of an upward stroke;

Fig. 2 is a similar view with the piston illustrated in section and adjacent the end of a downward stroke;

Fig. 3 is an enlarged fragmentary section of the engine cylinder with the correlated piston and the wear indicating apparatus illustrated in a tilted position therein, certain parts of the apparatus being broken away and certain other parts being shown in section for clarity of illustration;

Fig. 4 is an edge elevation of the wear indicating apparatus, with certain parts thereof broken away and in section;

Figs. 5, 6 and 7 are horizontal sections taken through 5—5, 6—6 and 7—7, respectively, of Fig. 2;

Fig. 8 is a perspective view of the arm adjusting and clamping nut of the apparatus;

Fig. 9 is a vertical longitudinal section taken through 9—9 of Fig. 1;

Fig. 10 is a perspective rear view of the transversely adjustable chart board of the apratus; and Fig. 11 is a perspective view of the longitudinally adjustable chart board supporting frame of the apparatus.

Beginning the more detailed description of the invention by reference to the drawings, the numeral 15 designates the upper member of the crank case of an internal combustion engine, 16 a water-jacketed cylinder fixedly secured thereto, 17 a piston reciprocatively mounted within said cylinder, and 18 a rod connecting the piston 17 to the crank shaft 19 of the engine, all of which are correlated and function in a well known manner with the other primary elements of the engine which will be recognized from the drawings without description. For purposes of a readier and clearer understanding of the advantages and benefits accruing from the use of the device of the invention, the walls of the cylinder 16 and piston 17 are preferably shown with excessive lateral wear or clearance therebetween, substantially as they would appear after long use.

The numeral 20 designates generally the wear indicating apparatus of the invention, 21 the vibratile bar or member thereof having a tongue-shaped upper terminal portion 22, adaptable for ready insertion and seating within the piston 17, the outer edge of which is provided with a series of serrations 23 frictionally engageable with the inner walls of said piston, and is longitudinally undercut adjacent to said serrations, whereby said edge will clear the skirt of the piston, when the vibratile bar 21 is operatively clamped therein, as more clearly shown in Figs. 3 and 5. The lower terminal portion 24 of the vibratile bar 21 serves and functions as a handhold therefor.

Pivotally connected to the sides of the vibratile bar 21, as at 25, for angular adjustment relative thereto, are the lower terminals of upwardly and outwardly extending clamping arms or jaws 26 having arcuately formed upper terminals 27 provided upon their outer edges with serrations 28 frictionally engageable with the inner walls of the piston 17, when the vibratile bar is operatively clamped therein, as shown more clearly in Fig. 5.

Interposed between the vibratile bar 21 and the angularly adjustable arms 26 is an arm adjusting and clamping nut 29 having one end thereof bifurcated and slidably mounted upon the inner edge of said vibratile bar, while the opposite end is provided with a downwardly and inwardly bevelled terminal portion 30, which is normally interposed between said arms, the side walls of said portion being preferably formed to converge slightly in a downward direction, to maintain the arms in spaced and slightly divergent relation, as more clearly shown in Fig. 4.

The nut 29 is also provided upon the side walls adjacent the portion 30 thereof with angularly disposed flanges 31, which extend outwardly therefrom to normally abut the inner edges of the arms 26, substantially in the manner disclosed in Figs. 1, 2 and 6, whereby angular adjustment of the arms 26 relative to the vibratile bar 21 and the clamping of the upper ends of the same within the piston to be tested is rapidly and expeditiously accomplished.

Integrally formed, or otherwise fixedly secured, in spaced parallel relation upon the inner edge of the vibratile bar 21, substantially midway the length thereof, are laterally extending and axially aligned apertured bosses or ears 32, wherein is rotatively mounted and guided the lower end portion of a nut adjusting rod or stem 33, and wherefrom said rod extends upwardly in axial alignment therewith and in spaced parallel relation to the inner edge of said vibratile bar to pass between the angularly adjustable arms 26, whereat the upper end portion of the rod 33 is screw-threaded for engagement within the nut 29, as shown more clearly in Figs. 3 and 4. The lower end portion of the rod 33 is positively retained against axial dislodgement or movement within the bosses 32 by a collar 34 detachably secured upon said rod and abutting the upper face of the upper boss 32 and by an annular shoulder 35 integrally formed upon the lower end of the rod 33 and abutting the lower face of the lower boss 32, substantially as illustrated in Figs. 1, 2, 4 and 9. The rod 33 is provided at the lower end thereof with a squared terminal 36 engageable by a wrench or the like, whereby the said rod is rotated and the nut 29 adjusted thereon to open or close the arms 26 relative to the vibratile bar 21, as will be manifest and apparent.

The vibratile bar 21 adjacent the upper end of the handhold 24 is medially apertured and provided upon one side thereat with a nipple 37, wherethrough a pencil 38 extends and is positively retained in selective longitudinally adjusted positions therein by a set screw 39, as shown more clearly in Fig. 4.

The numeral 40 designates an L-shaped supporting frame or member, substantially rectangular in cross-section, and provided at the upper end of the vertical leg thereof with spaced jaws 41 for the reception therebetween of the longitudinally disposed flange 42 formed upon the lower edge of the upper crank case member 15, one of said jaws having a clamping screw 43 threadedly mounted therein for abutment with said flange, whereby said frame is clamped thereto and extends downwardly and inwardly therefrom in transversely disposed relation to the said upper crank case member, as more clearly indicated in Figs. 1 and 2.

Slidably mounted upon the transversely disposed horizontal leg of the frame 40 is a depending metallic plate 44 having a chart board 45 of wood or other suitable material rigidly secured thereto, which chart board is positively retained in selective laterally adjusted positions relative to the engine cylinders by a set screw 46 clamping the depending metallic plate 44 to the frame 40.

Attached to the face of the chart board 45, as by thumb tacks 47, is a card or sheet 48 having imprinted or impressed thereon a series of consecutively numbered rectangular spaces 49, wherein graphic or diagrammatic representations 50 of the general conditions existent within the correspondingly numbered cylinders under test, and more particularly the amount of clearance or wear between the walls of such cylinders and the walls of the correlated pistons thereof, are accurately charted or traced during the operation of the wear indicating apparatus 20.

In the operation of the wear indicating apparatus of the invention, to obtain a chart or graphic representation of the location and amount of wear of the engine cylinders and pistons of an automotive vehicle, said vehicle is jacked up, the lower member of the crank case of the engine dropped off, and the spark plugs taken out to relieve compression in the cylinders, the piston of the cylinder to be inspected is lowered to the approximate position indicated in Fig. 2, the upper serrated terminals of the vibratile bar 21 and the arms 26 are inserted therein to engage and seat upon the inner walls thereof between the latter and the upper end of the connecting rod associated therewith and are rigidly clamped within the piston in an obvious manner, the piston with the rigidly depending vibratile bar 21 is then elevated to the approximate position indicated in Fig. 1. The frame 40 is clamped to the flange 42 of the upper crank case member 15 in such a manner that the transversely disposed horizontal leg is disposed in proximity to the depending vibratile bar 21. The chart board 45 with a card 48 attached thereto is adjusted longitudinally upon the said horizontal leg to position a rectangular space 49, having the number corresponding to the cylinder being inspected, in register with the pencil 38 of the bar 21, which pencil is longitudinally adjusted within said bar to contact with the card 48, substantially as shown in Fig. 9. With the piston and apparatus in the position herein described the engine crank shaft 19 is turned slowly by an assistant in a counter-clockwise direction to lower the piston and concurrently therewith the bar 21 is laterally vibrated by the operator to oscillate the piston upon the correlated wrist pin thereof, in the manner disclosed in Fig. 3, during such combined downward and oscillative movements of the piston the wear or clearance existing between the walls of the cylinder and said piston is diagrammatically or graphically recorded within the rectangular space 49 by the moving pencil 38 in contact therewith and tracing a line of wavelike or undulating appearance therein. Manifestly, should considerable wear exist between the cylinder and piston walls the wavy or undulating appearance of the traced line will be pronounced, while, with only negligible wear existing therebetween the wavy or undulating appearance of said line will be very slight. Upon completion of the above described operation the apparatus is removed from the tested piston, in an obvious manner, and such operation is repeated for each cylinder and piston of the engine.

From the foregoing it will be obvious and apparent, that the device of the invention is extremely simple, durable and economical in construction, is convenient to use, is positive and efficient in operation, will not readily get out of order, and conserves much time and energy in accurately determining the actual conditions of wear between the cylinder and piston walls of automotive internal combustion engines by merely removing the lower crank case members and spark plugs thereof. Further, the employment of such a device by garagemen, repairmen, and others, enable the same to quickly furnish to their customers and patrons, charts positively and convincingly indicating the real condition of their engine cylinders and pistons, thus eliminating futile discussion relative to which pistons, if any, require replacement.

In the accompanying drawings and in the specification the chart board 45 is illustrated and described as mounted upon the frame 40, but, it is to be understood that such frame may dispensed with in some instances and said chart board temporarily attached to the floor or other suitable supporting surface, and in certain other instances where a chart is not desired, as for example, when the operator merely wishes to ascertain if excessive wear exists between the cylinder walls and pistons, such chart board may also be dispensed with, and the amount of vibratory action of the bar 21 measured by a rule.

While I have herein shown and described my invention with sufficient detail to enable those skilled in the art to understand the mode of construction and the principles involved, it is to be understood that there is no intentional limitation herein to the specific form and precise details of construction of the invention herein shown and described, except as expressly defined by the appended claims, and that various modifications of said construction may be resorted to without departing from the invention, or the benefits, derivable therefrom. I also desire to have it understood that certain features of the invention herein disclosed may be employed in other combinations than those herein shown.

Having thus fully described my invention, what I claim as new and desire to secure by Letters Patent is:

1. In an apparatus of the character described, comprising a vibratile member adaptable for engaging a piston to be tested while the same is operatively mounted upon its connecting rod, whereby such piston is oscillated during reciprocation within its correlated cylinder, and means for detachably securing said member to said piston.

2. In an apparatus of the character described, comprising a vibratile member adaptable for engaging a piston to be tested while the same is operatively mounted upon its connecting rod, whereby such piston is oscillated during reciprocation within its correlated cylinder and means mounted upon said member for detachably securing the same to said piston.

3. In an apparatus of the character described, comprising a dependent vibratile bar insertible at its upper end within a piston to be tested while the same is operatively mounted upon its connecting rod, whereby such piston is oscillated during reciprocation within its correlated cylinder, and means for detachably securing said bar to said piston.

4. In an apparatus of the character described, comprising a dependent vibratile bar insertible at its upper end within a piston to be tested while the same is operatively mounted upon its connecting rod, means carried by said bar and adapted to straddle said connecting rod for clamping the upper end of the bar within said piston, and a handhold on the lower end of the bar whereby the interconnected bar and piston are oscillated during reciprocation of the latter within its correlated cylinder.

5. In an apparatus of the character described, comprising a dependent vibratile bar having a serrated upper end insertible within a piston to be tested, an angularly adjustable clamping arm pivotally mounted upon said bar having a serrated upper end insertible within said piston, means to clamp said upper ends within the piston, and a handhold on the lower end of said bar whereby the interconnected bar and piston are oscillated during reciprocation of the latter within its correlated cylinder.

6. In an apparatus of the character described, comprising a dependent vibratile bar having a serrated upper end insertible within a piston to be tested, angularly adjustable clamping arms pivotally mounted upon the sides of said bar having serrated upper ends insertible within said piston, a threaded rod rotatively mounted upon said bar in spaced parallel relation thereto, an arm clamping nut adjustably mounted upon said rod and slidably interposed between said bar and arms for rigidly clamping the serrated upper ends of the same within the piston, and a handhold on the lower end of said bar whereby the interconnected bar and piston are oscillated during reciprocation of the latter within its correlated cylinder.

In testimony whereof I affix my signature.

STUART M. MILNE.